(12) United States Patent
Nosaka et al.

(10) Patent No.: US 7,311,625 B2
(45) Date of Patent: Dec. 25, 2007

(54) ROTATING APPARATUS WITH A TORQUE LIMITER FUNCTION

(75) Inventors: Michiyasu Nosaka, Anjo (JP); Shozo Tatematsu, Nagoya (JP); Motohiko Ueda, Okazaki (JP); Koichi Hashinaga, Pulling (DE)

(73) Assignee: DENSO CORPORATION, Kariya (JP)

( * ) Notice: Subject to any disclaimer, the term of this patent is extended or adjusted under 35 U.S.C. 154(b) by 472 days.

(21) Appl. No.: 10/755,681

(22) Filed: Jan. 13, 2004

(65) Prior Publication Data

US 2004/0166944 A1  Aug. 26, 2004

(30) Foreign Application Priority Data

| Jan. 16, 2003 | (JP) | ............................. 2003-007915 |
| Mar. 18, 2003 | (JP) | ............................. 2003-074142 |
| May 9, 2003 | (JP) | ............................. 2003-131923 |

(51) Int. Cl.
*F16H 61/00* (2006.01)

(52) U.S. Cl. ........................... 474/70; 474/74; 474/199

(58) Field of Classification Search ................. 474/70, 474/199, 94; 192/56.1, 41 R, 45, 109 R, 192/55.6; 464/32, 76, 180; 417/319; 310/217–218
See application file for complete search history.

(56) References Cited

U.S. PATENT DOCUMENTS 5,128,576 A * 7/1992 Obradovic .................. 310/217
5,295,796 A * 3/1994 Goto et al. ............... 417/222.1
5,800,137 A * 9/1998 Eitai et al. .................. 417/319
6,332,842 B1 12/2001 Tabuchi et al.
6,893,368 B2 * 5/2005 Fujiwara et al. .............. 474/70
6,932,729 B2 * 8/2005 Ochiai .......................... 474/74
7,025,680 B2 * 4/2006 Tabuchi et al. ............... 464/32
2003/0017909 A1 * 1/2003 Murase et al. ................ 476/45
2003/0130044 A1 7/2003 Kanai et al.

FOREIGN PATENT DOCUMENTS

| EP | 0254295 A1 * | 1/1988 |
| JP | 08-319945 A * | 12/1996 |
| JP | A-H10-9122 | 1/1998 |
| JP | 2001-20859 A * | 1/2001 |
| JP | 2001-295857 A * | 10/2001 |
| JP | A-2002-54711 | 2/2002 |
| JP | A-2003-206950 | 7/2003 |

* cited by examiner

Primary Examiner—Marcus Charles
(74) Attorney, Agent, or Firm—Posz Law Group, PLC

(57) ABSTRACT

A screw engagement portion between a pulley and a shaft is provided with a thread in a direction to increase the tightening torque when the pulley is driven. A breakable part broken by the axial tension produced when the tightening torque acting on the screw engagement portion is above a predetermined value, is also provided. The stress to break the breakable part is mainly a tensile stress. The tensile stress is substantially uniformly distributed in a cross section and, hence, the stress distribution of the breakable part can be relatively precisely predicted and analyzed. Consequently, the necessity of determining aspects of the breakable part, such as dimension, material, and the like, by trial and error is reduced. The breakable part can be broken without being subject to fatigue fracture.

4 Claims, 10 Drawing Sheets

ROTATING APPARATUS WITH A TORQUE LIMITER FUNCTION

BACKGROUND OF THE INVENTION

1. Field of the Invention

The present invention relates to a rotating apparatus with a torque limiter function and is advantageously applicable to a compressor of a vapor-compression type refrigerator for a vehicle.

2. Description of the Related Art

A compressor of a vapor-compression type refrigerator for a vehicle is powered by the engine for moving the vehicle. The compressor or a pulley driven by a belt has a torque limiter function to prevent transmission of the torque when the transmission torque is above a predetermined value, in order to protect devices and components, such as a belt, provided on the drive source side, when a sliding part of the compressor is stuck due to burning, etc.

In a conventional, rotating apparatus with a torque limiter function, a breakable part whose diameter is smaller than those of the remaining portion is provided on a shaft of the compressor, so that the breakable part can be preferentially twisted and broken when the transmission torque is above a predetermined value in order to realize a torque limiter function.

In the above-mentioned solution in which power transmission is interrupted by breaking the easily breakable part provided on the shaft, the manufacturing cost can be reduced because the power transmission can be prevented by a simple structure, but the design and development thereof are made difficult for the following reasons.

That is, the strength of the breakable part must be such that it can be broken at a predetermined torque (hereinafter referred to as a breaking torque) T1. However, fatigue breakage (fatigue fracture) occurs at a torque smaller than the breaking torque, as is well known.

The maximum torque, i.e., an allowable torque T2, acting on the breakable part must be smaller than a value obtained by dividing the breaking torque T1 by a safety factor S.

If a ratio (=T1/T3) of the breaking torque T1 to the maximum value of torque (hereinafter referred to as a necessary transmission torque) T3 that must be transmitted, is smaller than the safety factor S, the necessary transmission torque T3 exceeds the allowable torque T2 and, hence, power cannot be transmitted.

In general, the safety factor S must be made larger as theoretical analysis of the stress is made more difficult due to a complicated state of stress that occurs in a structure. Therefore, if the stress that occurs in the breakable part can be precisely calculated and analyzed, the safety factor S can be reduced and the allowable torque T2 can be increased.

The above-mentioned breakable part is broken mainly by twisting, i.e., a shearing force (tangential stress). As the shearing force tends to be concentrated on a surface, it is difficult to precisely calculate and analyze the stress distribution.

In a structure similar to the above-mentioned rotating apparatus, because the dimension and the material, etc. of the breakable part must be determined by trial and error, there are difficulties in designing and developing the same and the actual breaking torque varies, thus leading to a fear of malfunction of the torque limiter such as an occurrence of breakage of the breakable part by twisting at a torque lower than the breaking torque.

SUMMARY OF THE INVENTION

To solve the above problems, the present invention is aimed primarily to provide a rotating apparatus having a novel torque limiter function different from the conventional one and secondarily to prevent the power transmission at a predetermined torque.

In order to accomplish the above object, according to a first aspect of the present invention, there is, provided a rotating apparatus with a torque limiter function, comprising an input side rotating member which is rotated in accordance with a drive force produced by a drive source; and an output side rotating member which is connected to the input side rotating member through a screw engagement and is rotated integrally with the input side rotating member; wherein the screw engagement portion, between the input side rotating member and the output side rotating member, is provided with threads so as to increase a tightening torque when the input side rotating member is powered by the drive source; and at least one of the input side rotating member and the output side rotating member is provided with a breakable part which is fractured due to a tensile axial force produced by the tightening torque when the tightening torque acting on the screw engagement portion is above a predetermined value.

In the invention, the stress at which the breakable parts are fractured is not a shearing stress but mainly a tensile stress (a normal stress) caused by a tensile axial force. Unlike the shearing stress, the tensile stress is generally uniformly distributed in a cross section, so that the stress distribution of the breakable parts can be relatively precisely calculated and analyzed.

Consequently, the necessity to determine the dimension and the material, etc. of the breakable parts by trial and error is reduced to facilitate the design and development. The breakable parts can be certainly broken at a predetermined torque, without being fractured by fatigue, so that no misoperation of torque limiter function occurs.

Strictly speaking, as the tightening torque increases, the shearing stress increases along with an increase of the axial tension. However, because an influence of the shearing stress is remarkably less than that of the tensile stress, the breakable parts are broken mainly by the tensile stress cause by the tensile axial force.

According to a second aspect of the present invention, there is provided a rotating apparatus with a torque limiter function, wherein the screw engagement portion comprises a male screw part provided on the output side rotating member and a female screw part provided on the input side rotating member, and the breakable part is constituted by a reduced diameter portion formed on a part of the output side rotating member and having an equivalent diameter smaller than the screw diameter of the male screw part.

According to a third aspect of the present invention, there is provided a rotating apparatus with a torque limiter function, wherein the output side rotating member is in the form of a shaft having a stepped portion defined by a small diameter part and a large diameter part; the male screw part and the breakable part are provided on the small diameter part; and the input side rotating member is pressed against the stepped portion by the axial tension produced by the tightening torque.

According to a fourth aspect of the present invention, there is provided a rotating apparatus with a torque limiter function, comprising an input side rotating member which is rotated in accordance with a drive force produced by a drive source; and an output side rotating member which is connected to the input side rotating member and is rotated integrally with the input side rotating member; said output side rotating member being rotated while receiving a bending moment from the input side rotating member; the portion of said output side rotating member that is subject to the bending moment being provided with a breakable part which is broken when the bending moment is above a predetermined value.

As is well known, a bending stress due to a bending moment is not a shearing stress (a tangential stress) but mainly a tensile stress caused by a tensile axial force and a compression stress, i.e., a normal stress. Unlike a shearing stress, a normal stress is substantially uniformly distributed in a cross section, so that the stress distribution of the breakable part can be relatively precisely calculated and analyzed.

Consequently, the necessity to determine the dimension and the material, etc. of the breakable part by trial and error is reduced to facilitate the design and development. The breakable part can be certainly broken at a predetermined torque, without being fractured by fatigue, so that no misoperation of torque limiter function occurs.

According to a fifth aspect of the present invention, there is provided a rotating apparatus with a torque limiter function, comprising an input side rotating member which is rotated in accordance with a drive force produced by a drive source; an intermediate rotating member which is connected to the input side rotating member through a screw engagement and is rotated integrally with the input side rotating member; and an output side rotating member which is connected to the intermediate rotating member through a screw engagement and is rotated integrally with the intermediate rotating member; wherein the screw engagement portion between the input side rotating member and the intermediate rotating member and the screw engagement portion between the intermediate rotating member and the output side rotating member are provided with threads so as to increase a tightening torque when the input side rotating member is driven by the drive source; and the intermediate rotating member is provided with a breakable part which is broken by tensile axial. force produced by the tightening torque when the tightening torque acting on the screw engagement portions is above a predetermined value.

In the invention, the stress at which the breakable part are fractured is not a shearing stress but mainly a tensile stress (a normal stress) caused by a tensile axial force. Unlike the shearing stress, the tensile stress is generally uniformly distributed in a cross section, so that the stress distribution of the breakable part can be relatively precisely calculated and analyzed.

Consequently, the necessity to determine the dimension and the material, etc. of the breakable part by trial and error is reduced to facilitate the design and development. The breakable part can be certainly broken at a predetermined torque, without being fractured by fatigue, so that no misoperation of torque limiter function occurs.

Incidentally, the reference numerals in parentheses, to denote the above means, are intended to show the relationship of the specific means which will be described later in an embodiment of the invention.

The present invention may be more fully understood from the description of preferred embodiments of the invention set forth below, together with the accompanying drawings.

DESCRIPTION OF THE PREFERRED EMBODIMENTS

Figure 1:
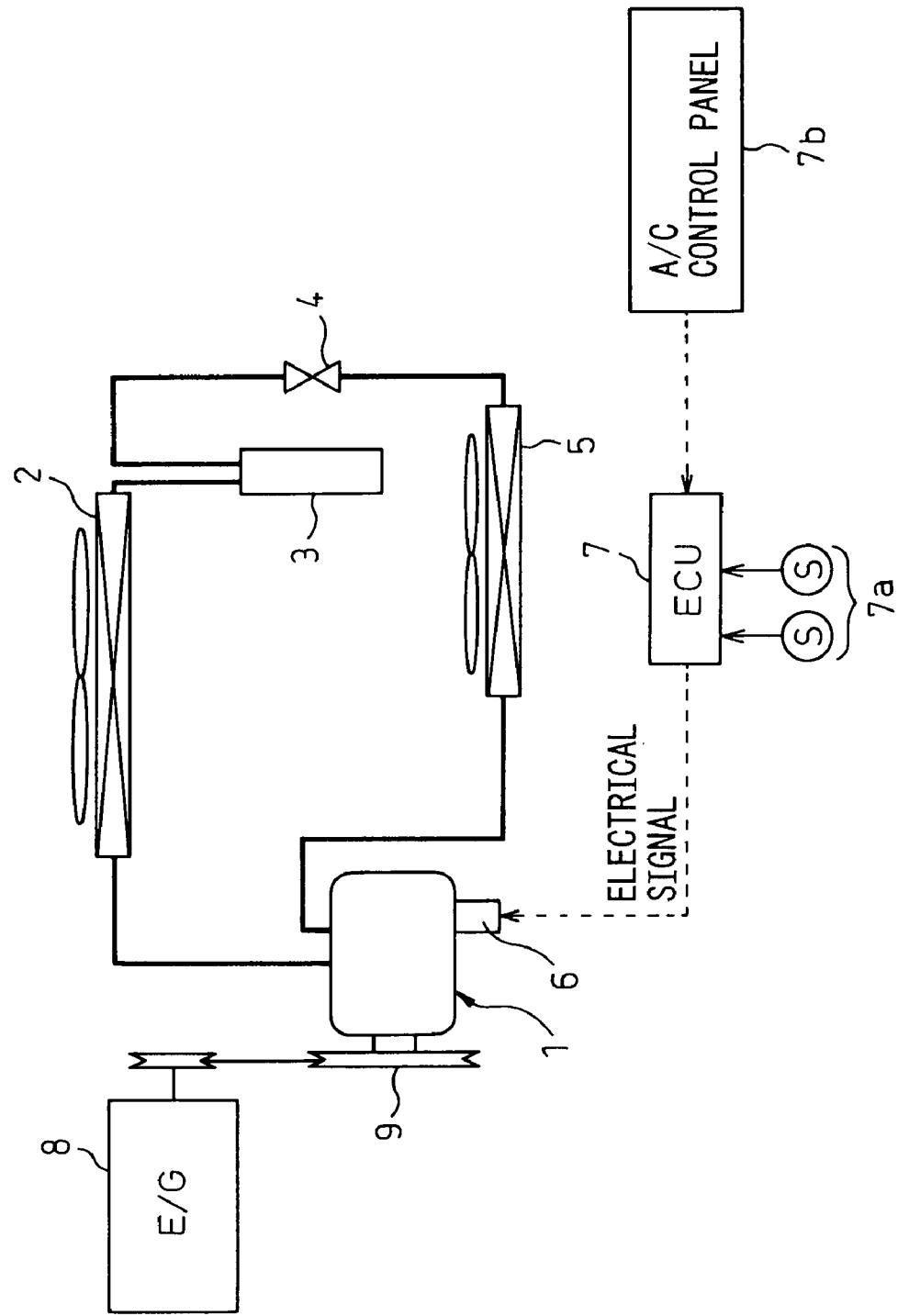
FIG. 1 is a schematic view of an air conditioner (a vapor-compression type refrigerator) for a vehicle according to an embodiment of the present invention.
Figure 2:
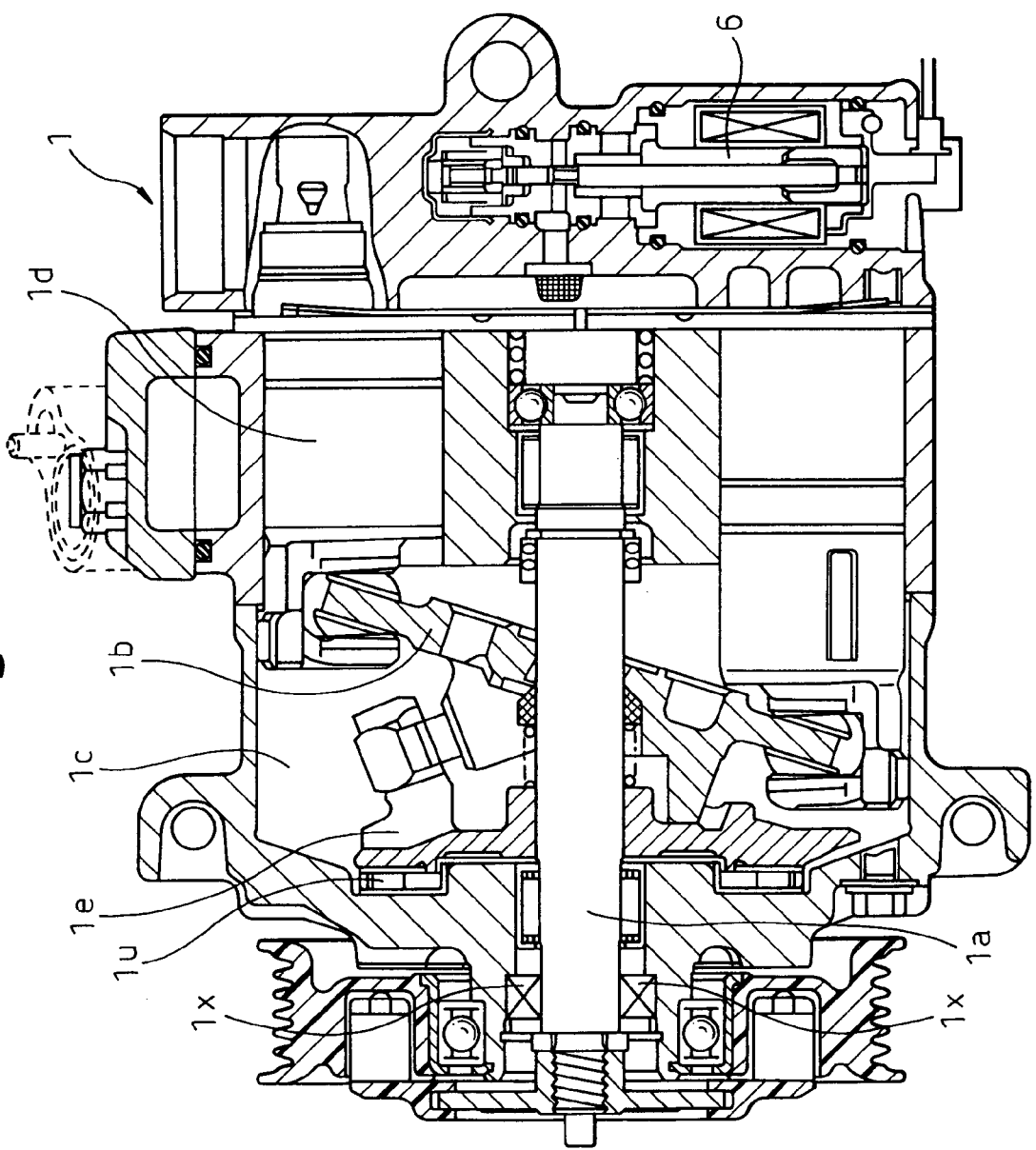
FIG. 2 is a cross-sectional view of a swash plate type variable displacement compressor according to Embodiment 1 of the present invention.

Embodiment 1 of the present invention will be explained below. In Embodiment 1, a rotating apparatus having a torque limiter function according to the present invention is applied to a compressor of a vapor-compression type refrigerator (an air conditioner) for a vehicle. FIG. 1 is a schematic view of an air conditioner for a vehicle. FIG. 2 is a cross-sectional view of the compressor 1.

As shown in FIG. 1, the air conditioner for a vehicle is comprised of a radiator 2 for heat-exchanging a high-temperature, high-pressure cooling medium compressed by the compressor 1 and the ambient air, to cool the cooling medium, a receiver 3 which separates the cooling medium discharged from the radiator 2, into a liquid-phase cooling medium and a vapor-phase cooling medium and stores the surplus cooling medium as a liquid-phase cooling medium, a decompressor 4 which decompresses the liquid-phase cooling medium supplied from the receiver 3 and an evaporator 5, etc., serving as an interior heat exchanger which heat-exchanges the decompressed low-temperature, low-pressure cooling medium and the air discharged in a chamber to thereby evaporate the liquid-phase cooling medium.

As shown in FIG. 2, the compressor 1 is a conventional, swash plate type variable displacement compressor which controls the pressure in a swash plate chamber (a crankcase) $1c$, changes an oblique angle of a swash plate $1b$ with respect to a shaft $1a$ and changes the stroke of a piston $1d$, so that the discharging capacity can be varied.

Concretely, the suction side of the compressor 1 and the swash plate chamber $1c$ are constantly connected through a restriction (not shown), such as an orifice or a capillary tube, in which a predetermined pressure loss occurs. A pressure control valve 6 is provided to control a communication state between a pressure introduction passage (not shown) through which the discharge side of the compressor 1 and the swash plate chamber $1c$ are connected. To increase the discharge capacity, the pressure introduction passage is restricted or closed to thereby reduce the pressure in the swash plate chamber 1c, and to reduce the discharge capacity, the pressure in the swash plate chamber 1c is increased.

As shown in FIG. 1, the pressure control valve 6 is controlled by an electronic control unit (ECU) 7.

According to this embodiment, the ECU 7 duty-controls the pressure control valve 6 so that the pressure (evaporating temperature) in the evaporator 5 or the temperature of the air directly after passing through the evaporator 5 is a predetermined target temperature (TEO).

The detection signals of air conditioner sensors 7a, such as an outside air temperature sensor, an inside air temperature sensor and a post-evaporation sensor for detecting the temperature of an air directly after passing through the evaporator 5 are input to the ECU 7, and a preset value set by an occupant through a control panel 7b is stored in the ECU 7.

The ECU 7 calculates the post-evaporation target air temperature TEO and the target discharged-air temperature TAO based on the input value, and controls the compressor 1 (pressure control valve 6), etc.

The compressor 1 which is powered by an internal combustion engine serving as a drive source for moving a vehicle, i.e., an engine 8, operates mechanically in association with start and stop of the engine 8, through a V-belt and a pulley 9 which constitutes an input side rotating member.

The compressor 1 starts and stops operating upon start and stop of the engine 8. With this structure, if a starting switch (A/C switch) of the air conditioner provided on an operating panel 7b is turned off, a swash plate 1b and a lug plate 1e (see FIG. 2), etc. continue rotating while the engine 8 is running.

The pulley 9 and the torque limiter function according to this embodiment will be explained below.

Figure 3:
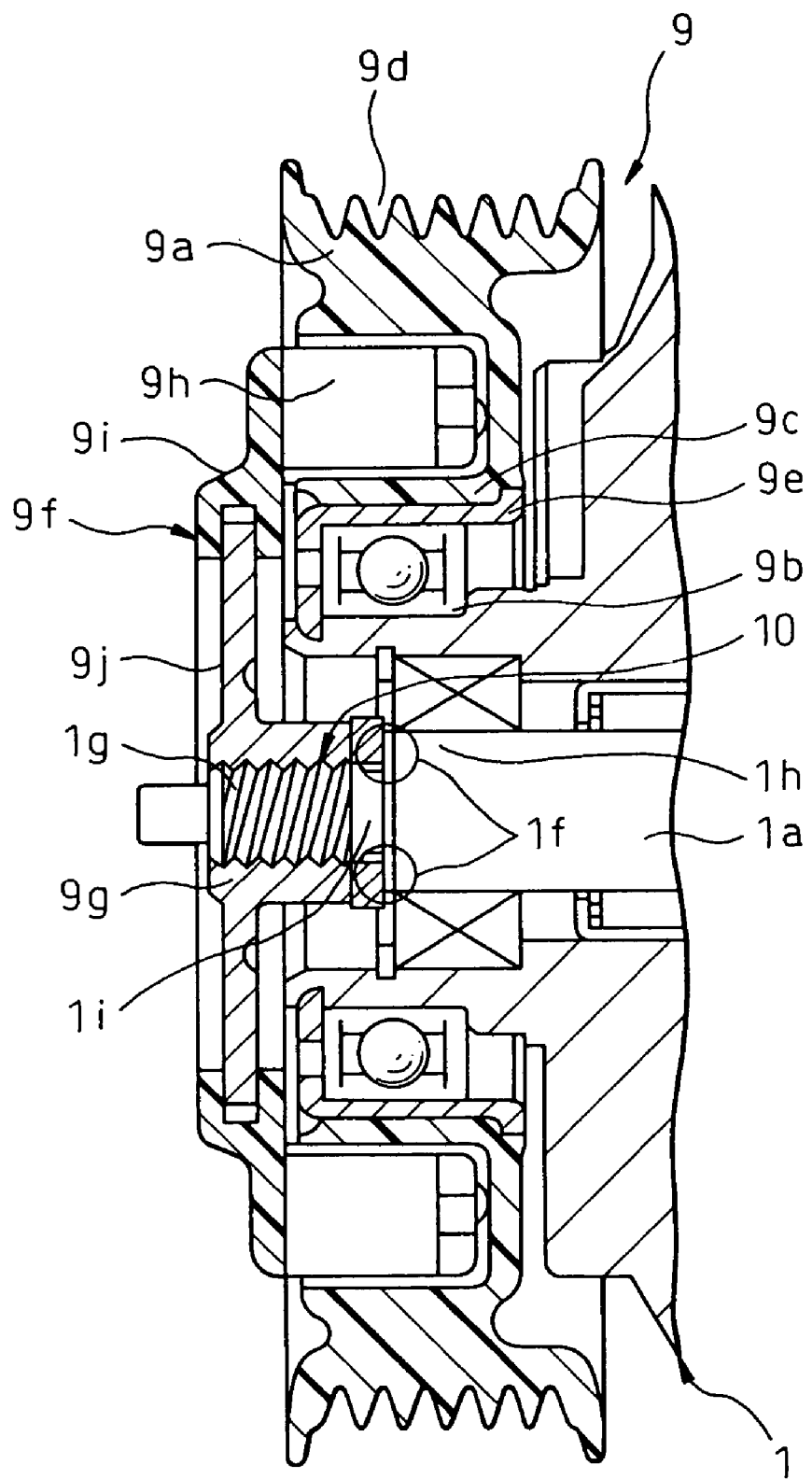
FIG. 3 is an enlarged, cross-sectional view of a pulley according to Embodiment 1 of the present invention.

FIG. 3 is an enlarged, cross-sectional view of the pulley 9. A pulley body 9a is substantially a cylindrical rotor of metal or hard resin (phenol in this embodiment), which is powered and rotated by the engine 8 through the V-belt. A cylindrical pulley hub 9c, to which a radial, roller bearing 9b to rotatably support the pulley body 9a is attached, is integrally provided on an inner peripheral side of the pulley 9. An inner race of the radial roller bearing 9b is press-fitted in a front housing of the compressor 1.

According to this embodiment, a pulley with a plurality of lines of V-shaped grooves 9d, applicable to a polydrive belt is used for the pulley body 9a. The pulley body 9a is made of resin and a metal sleeve 9e is insert-molded integrally with the inner peripheral surface of the pulley hub 9c which supports the bearing 9b.

A center hub 9f is a rotor connected to the shaft 1a constituting an output side rotating member, through a screw engagement, and rotates with the shaft 1a. The center hub 9f is comprised of a boss 9g provided with a female screw to be engaged with a male screw formed on the outer peripheral surface on the a front end side of the shaft 1a, a plate 9i provided with a plurality of projections 9h projecting toward the pulley body 9a side to receive the torque transmitted from the pulley body 9a, and a bridge 9j which mechanically connects the plate 9i and the boss 9g so that the torque is transmitted from the plate 9i to the boss 9g, etc.

According to this embodiment, the boss 9g and the bridge 9j are integrally formed by sintering a metal powder. The plate 9i is made of resin and the bridge 9j and plate 9i are integrally insert-molded. As a matter of course, the entirety of the center hub 9f can be integrally formed of resin or metal.

The front end side of the shaft 1a has a stepped portion if defined by a small diameter part 1g provided with a male screw part and a large diameter part 1h. When the pulley 9 is fastened to the shaft 1a, the contact surface pressure of the pulley 9, i.e., the boss 9g with the stepped portion 1f is increased and, hence, the tensile axial force acting on the small diameter part 1g, i.e., a fastening force and the fastening torque generated at the screw engagement portion 10 are increased.

According to this embodiment, the screw engagement portion 10 between the pulley 9, i.e., the boss 9g and the shaft 1a is provided with a thread in a direction to increase the tightening torque at the screw engagement portion 10 when the pulley 9 is powered by the engine 8. The breakable part 1i which is broken by the tensile axial force produced in accordance with the tightening, when the tightening torque acting on the screw engagement portion 10 is above a predetermined value, is provided.

The tightening torque of the shaft 1a to the pulley 9 has a predetermined value which is smaller than a torque at which the breakable part 1i is broken, i.e., the breaking torque at which the power transmission is interrupted, so as to fulfill the torque limiter function, but is larger than a torque necessary for driving the compressor 1.

According to this embodiment, the root side of the small diameter part 1g, i.e., a portion thereof close to the large diameter part 1h is reduced in diameter and has an equivalent diameter smaller than the screw diameter of the male screw part, to constitute the breakable part 1i.

The "equivalent diameter" refers to a diameter of a cross-sectional area in terms of a circle. According to this embodiment, the breakable part 1i has a circular cross section and the equivalent diameter is equal to the diameter of the breakable part 1i.

The characteristic operations of the rotating apparatus having the torque limiter function according to this embodiment will be explained below. While the compressor 1 normally operates, the driving torque for driving the compressor 1 is smaller than the engaging torque and the torque output from the engine 8 by the frictional force in accordance with the axial tension generated at the screw engagement portion 10 is transmitted to the shaft 1a, i.e., the compressor 1.

When the sliding part of the compressor is stuck due to burning, etc. for some reasons, the tightening torque at the screw engagement portion 10 is increased in accordance with an increase in the torque transmitted to the pulley 9, to thereby increase the tensile axial force. Consequently, when the tensile axial force acting on the breakable part 1i is above the axial tension equivalent to the breaking torque, the breakable part 1i is broken to interrupt the transmission of the torque.

The mode of operation and effect of the rotating apparatus having the torque limiter function according to this embodiment will be explained below.

The stress at which the breakable part 1i is fractured is not a shearing stress but mainly a tensile stress (a normal stress) caused by a tensile axial force. Unlike the shearing stress, the tensile stress is generally uniformly distributed in a cross section, so that the stress distribution of the breakable part 1i can be relatively precisely calculated and analyzed.

Consequently, the necessity to determine the dimension and the material, etc. of the breakable part 1i by trial and error is reduced to facilitate the design and development. The breakable part 1i can be certainly broken at a predetermined torque, without being fractured by fatigue, so that no mis-operation of torque limiter function occurs.

Because the necessity to determine the dimension and material, etc. of the breakable part 1i by trial and error is reduced, not only can the productivity of the center hub 9f be increased but also the manufacturing cost of the pulley 9 can be reduced, compared with, for example, the structure in which the bridge 9j is broken to fulfill the torque limiter function.

As is apparent from the above explanation, according to this embodiment, the pulley 9 and the shaft 1a correspond to "an input side rotating member" and "an output side rotating member" respectively, which are described in claims.

Figure 4:
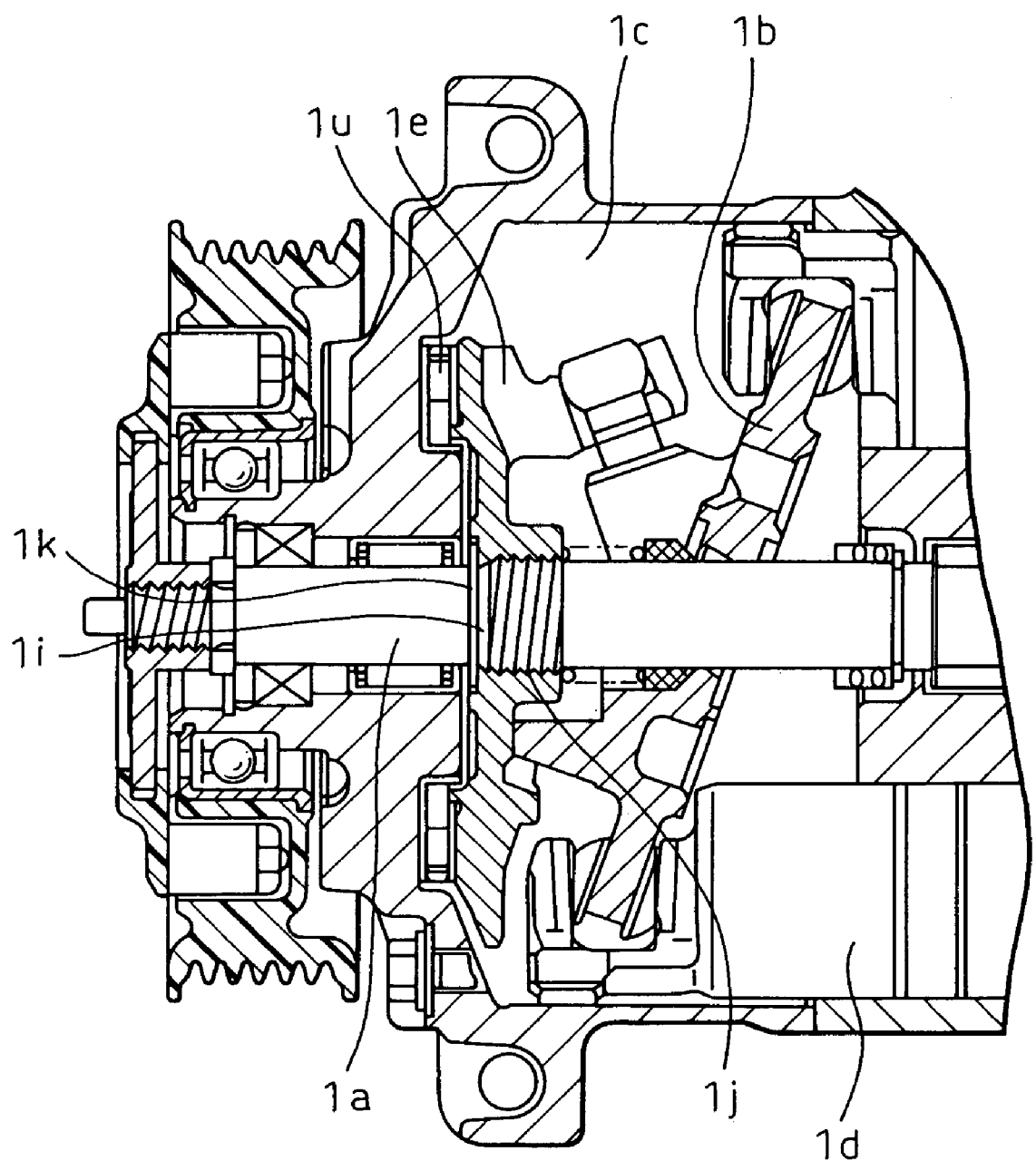
FIG. 4 is a cross-sectional view of a swash plate type variable displacement compressor according to Embodiment 2 of the present invention.
Figure 5:
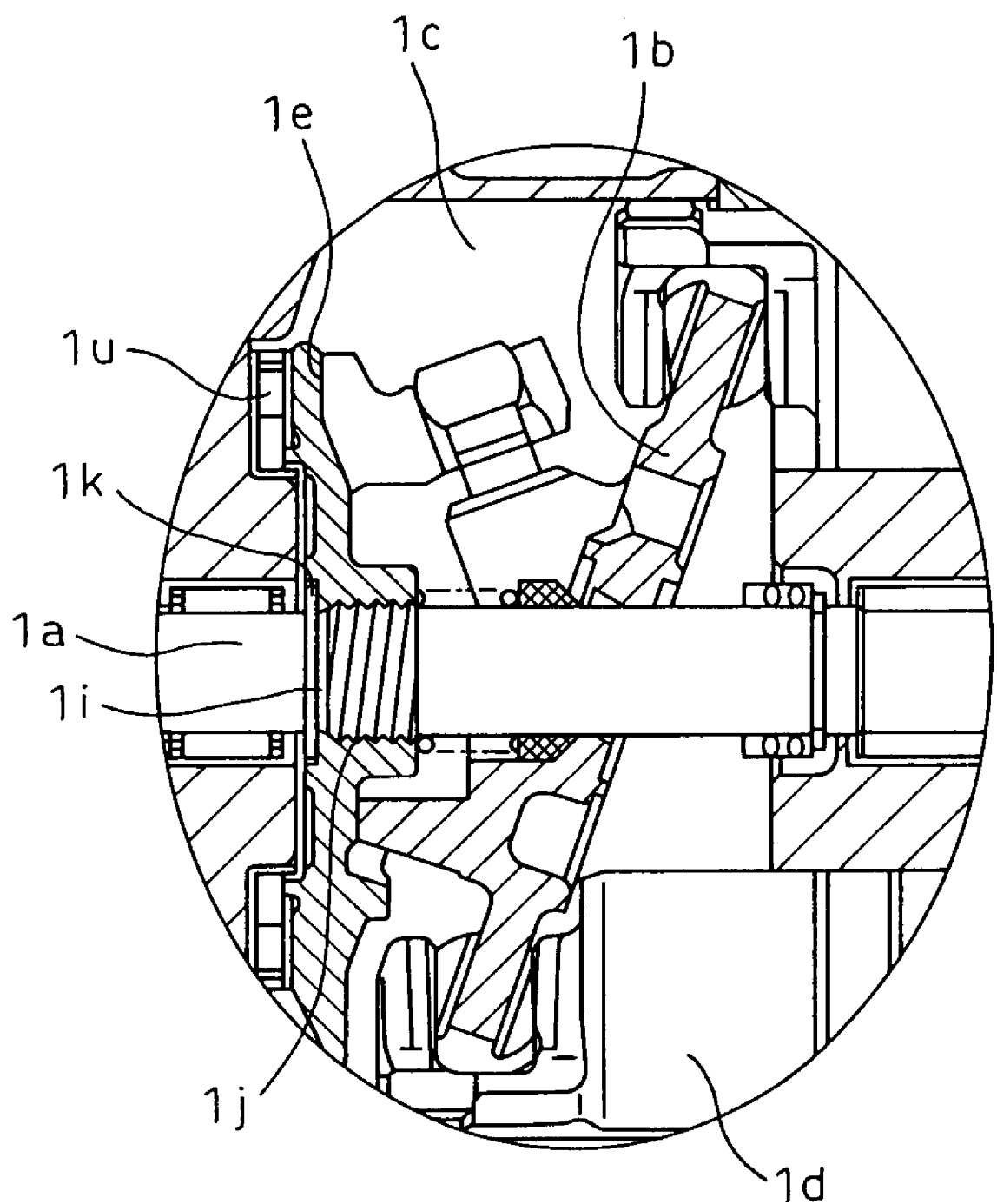
FIG. 5 is an enlarged view of FIG. 4.

Embodiment 2 of the present invention will be explained below. Though the breakable part 1i is provided on the portion of the shaft 1a that is located outside the compressor 1, i.e., outside the swash plate chamber 1c, in the first embodiment, an equivalent to the breakable part 1i is provided in the compressor 1, i.e., in the swash plate chamber 1c, according to the second embodiment. FIGS. 4 and 5 show the features of this embodiment and FIG. 5 is an enlarged view of FIG. 4.

In the concrete, as shown in FIGS. 4 and 5, the lug plate 1e is connected to the shaft 1a through a screw engagement, and the screw engagement portion 1j is provided with a thread in a direction to increase the tightening torque at the screw engagement portion 1j, when the pulley 9 is powered by the engine 8.

With this structure, if the tightening torque at the screw engagement portion 1j increases, the contact surface pressure of the lug plate 1e with a flange 1k provided on the shaft 1a increases, to thereby increase the tensile axial force of the shaft 1a, so that torque transmission from the shaft 1a to the lug plate 1e is performed mainly by the frictional force that is produced at the contact surfaces between the flange 1k and the lug plate 1e.

The engaging torque of the screw engagement portion 1j is a torque determined based on the maximum torque during a normal operation of the compressor 1, taking into account a predetermined safety factor.

When the compressor 1 normally operates, the torque is transmitted from the shaft 1a to the lug plate 1e by the frictional force produced at the contact surfaces between the flange 1k and the lug plate 1e.

The strength of the screw engagement portion 1j is such that the screw thread can be broken (in such a way that the thread is stripped) when a predetermined tightening torque larger than the engaging torque is applied thereto.

The characteristic operations of the compressor 1 according to this embodiment will be explained below.

While the compressor 1 normally operates, the driving torque for driving the compressor 1 is smaller than the engaging torque and the torque output from the engine 8 is transmitted from the shaft 1a to the lug plate 1e by the frictional force caused by the axial tension that is generated at the screw engagement portion 1j.

When the sliding part of the compressor is stuck due to burning, etc. for some reasons, the tightening torque at the screw engagement portion 1j is increased in accordance with an increase in the torque transmitted to the pulley 9, to thereby increase the tensile axial force. Consequently, when the tensile axial force acting on the screw engagement portion 1j is above the axial tension equivalent to the breaking torque, the screw engagement portion 1j is broken to interrupt the transmission of the torque.

The mode of operation and effect of this embodiment will be explained below.

As mentioned above, the stress at which the screw engagement portion 1j is fractured is not a shearing stress but mainly a tensile stress (a normal stress) caused by a tensile axial force. Unlike the shearing stress, the tensile stress is generally uniformly distributed in a cross section, so that the stress distribution of the screw engagement portion 1j can be relatively precisely calculated and analyzed.

Consequently, the necessity to determine the dimension and the material, etc. of the screw engagement portion 1j by trial and error is reduced to facilitate the design and development. The screw engagement portion 1j can be certainly broken at a predetermined torque, without being fractured by fatigue, so that no mis-operation of torque limiter function occurs.

As is apparent from the above explanation, according to this embodiment, the shaft 1a, the lug plate 1e and the screw engagement portion 1j correspond to "an input side rotating member", "an output side rotating member" and "a breakable part" respectively, which are described in claims.

Figure 6:
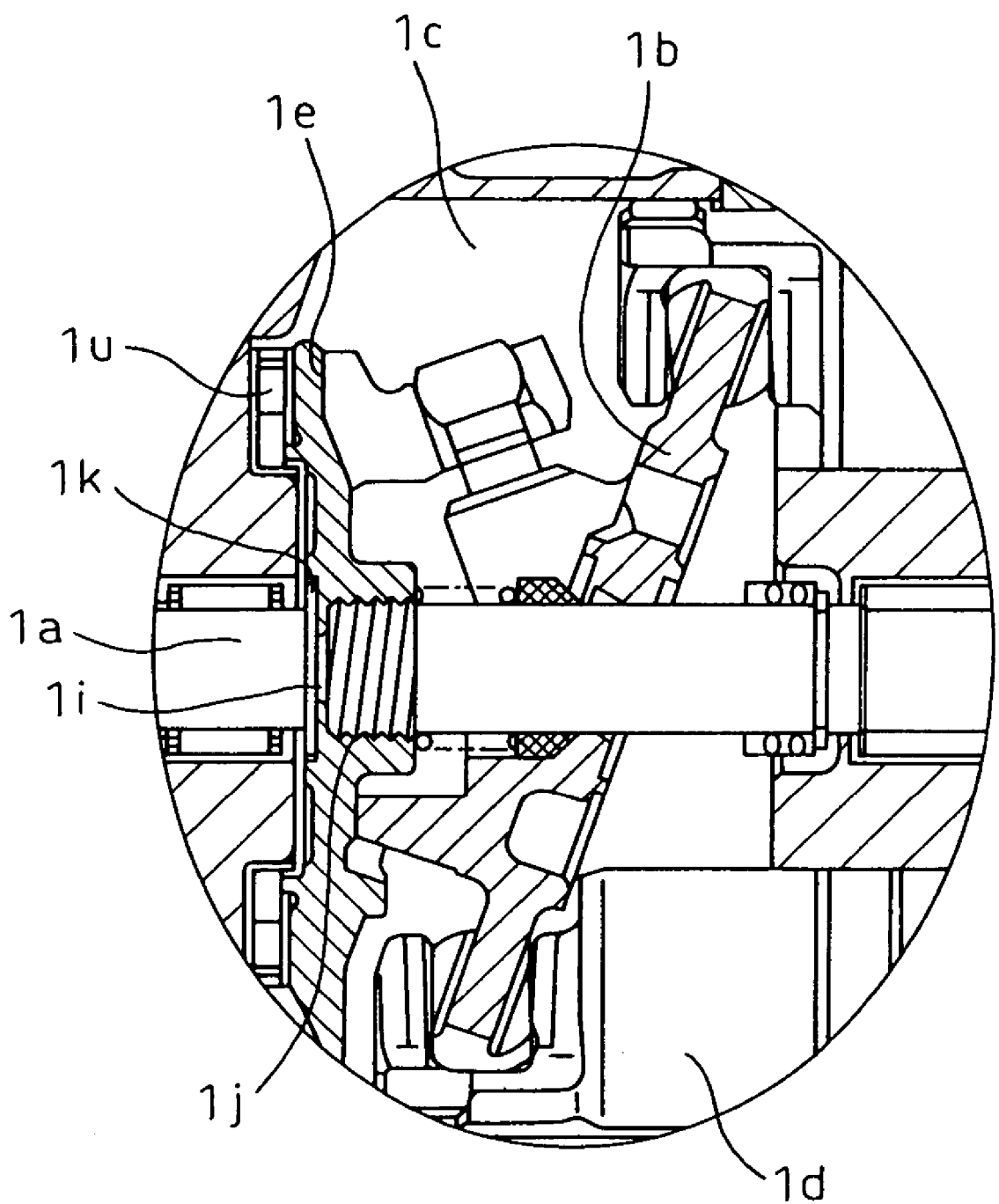
FIG. 6 is a cross-sectional view of a swash plate type variable displacement compressor according to Embodiment 3 of the present invention.

Embodiment 3 will be explained below. In Embodiment 2, the torque transmission is interrupted by stripping the screw thread of the screw engagement portion 1j. According to the third embodiment, as shown in FIG. 6, a reduced diameter portion having an equivalent diameter smaller than the screw diameter of the male screw part is provided, to constitute a breakable part 1i, in the vicinity of the flange 1k, i.e., at the root part of the male screw part close to the shaft 1a.

With this structure, as in Embodiments 1 and 2, when the sliding part of the compressor is stuck due to burning, etc., the tightening torque at the screw engagement portion 1j is increased in accordance with an increase in the torque transmitted to the pulley 9, to thereby increase the tensile axial force. Consequently, when the tensile axial force acting on the breakable part 1i is above the axial tension equivalent to the breaking torque, the breakable part 1i is broken to interrupt the transmission of the torque.

Figure 7:
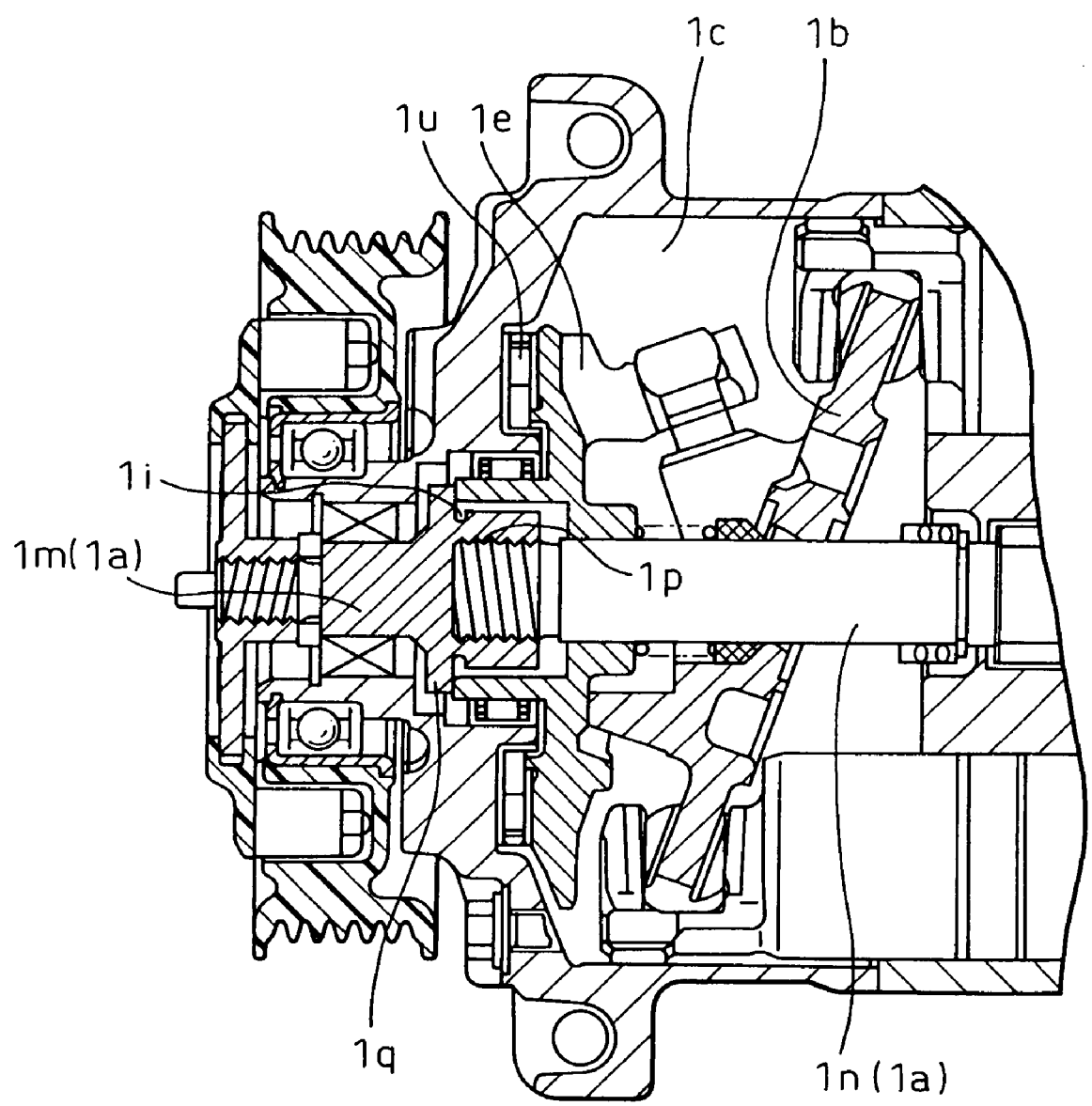
FIG. 7 is a cross-sectional view of a swash plate type variable displacement compressor according to Embodiment 4 of the present invention.

Embodiment 4 will be explained below. According to this embodiment, as shown in FIG. 7, the shaft 1a is comprised of two shafts 1n and 1m which are connected in series through a screw engagement and the engaging torque of the screw engagement portion 1p of the shafts 1n and 1m is a torque determined based on the maximum torque during a normal operation of the compressor 1, taking into account a predetermined safety factor.

With this structure, as in Embodiments 1 through 3, when the sliding part of the compressor is stuck due to burning, etc., the tightening torque at the screw engagement portion 1p is increased in accordance with an increase in the torque transmitted to the pulley 9, to thereby increase the tensile axial force. Consequently, when the tensile axial force acting on the breakable part 1i is above the axial tension equivalent to the breaking torque, the breakable part 1i is broken to interrupt the transmission of the torque.

According to this embodiment, the lug plate 1e is press-fitted in the shaft 1n. When the tightening at the screw engagement portion 1p is increased, the surface pressure produced at the contact surfaces between the flange 1q provided at the shaft 1m and the lug plate 1e increases, to thereby increase the tensile axial force generated at the shaft 1a. Consequently, the torque transmitted from the torque pulley 9 to the shaft 1m is transmitted mainly by the frictional force produced at contact surfaces between the flange 1q and the lug plate e.

According to this embodiment, the shaft 1m is provided with the breakable part 1i which is broken when the tensile axial force is above the axial tension equivalent to the breaking torque. However, as in Embodiment 2, it is possible that, when the tensile axial force is above an axial tension equivalent to the breaking torque, the screw engagement portion 1p is broken so as to interrupt the torque transmission, by setting the strength of the screw engagement portion 1p such that the screw thread can be stripped and broken when a predetermined tightening torque larger than the engaging torque is applied thereto.

As is apparent from the above explanation, according to this embodiment, the shaft 1m, the shaft 1n and the breakable part 1i correspond to "an input side rotating member", "an output side rotating member" and "a breakable part" respectively, which are described in claims.

Figure 8:
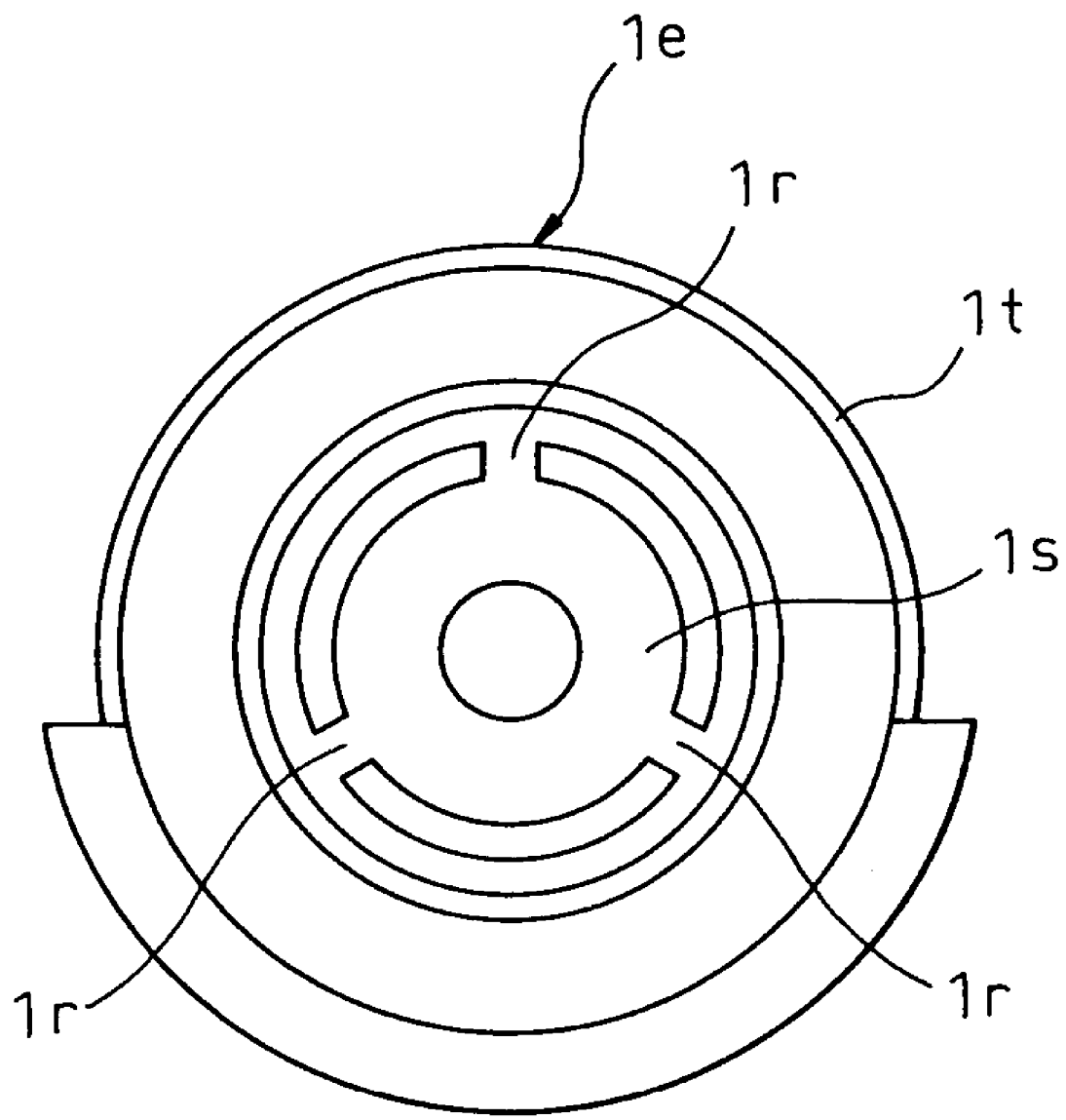
FIG. 8 is a front view of a lug plate $1e$ according to Embodiment 5 of the present invention.

Embodiment 5 will be explained below. According to this embodiment, as shown in FIG. 8, the lug plate 1e is provided with a bridge 1r which forms an easily breakable part whose mechanical strength is reduced. In the concrete, the lug plate 1e is comprised of a hub 1s secured to the shaft 1a, an outer periphery 1t located on the outer peripheral side and connected to the swash plate 1b, and the bridge 1r connecting the hub 1s to the outer periphery 1t. When the sliding part of the compressor is stuck due to burning, etc., the bending moment acts on the bridge 1r.

That is, the lug plate 1e rotates while receiving a bending moment about the thrust bearing 1u (see FIG. 2, etc.), from the shaft 1a. Thus, when the sliding part of the compressor is stuck due to burning, etc., the bending moment about the thrust bearing 1u is increased in accordance with an increase in the torque transmitted to the pulley 9, to thereby increase the bending moment acting on the bridge 1r. Consequently, the bridge 1r is broken and the torque transmission is interrupted.

In general, a bending stress due to a bending moment is not a shearing stress (a tangential stress) but mainly a tensile stress caused by a tensile axial force and a compression stress, i.e., a normal stress. Unlike the shearing stress, the normal stress is generally uniformly distributed in a cross section, so that the stress distribution of the bridge 1r can be relatively precisely calculated and analyzed.

Consequently, the necessity to determine the dimension and the material, etc. of the bridge 1r by trial and error is reduced to facilitate the design and development. The bridge 1r can be certainly broken at a predetermined torque, without being fractured by fatigue, so that no mis-operation of torque limiter function occurs.

As is apparent from the above explanation, according to this embodiment, the shaft 1a, the lug plate 1e and the bridge 1r correspond to "an input side rotating member", "an output side rotating member" and "a breakable part" respectively, which are described in claims.

Figure 9:
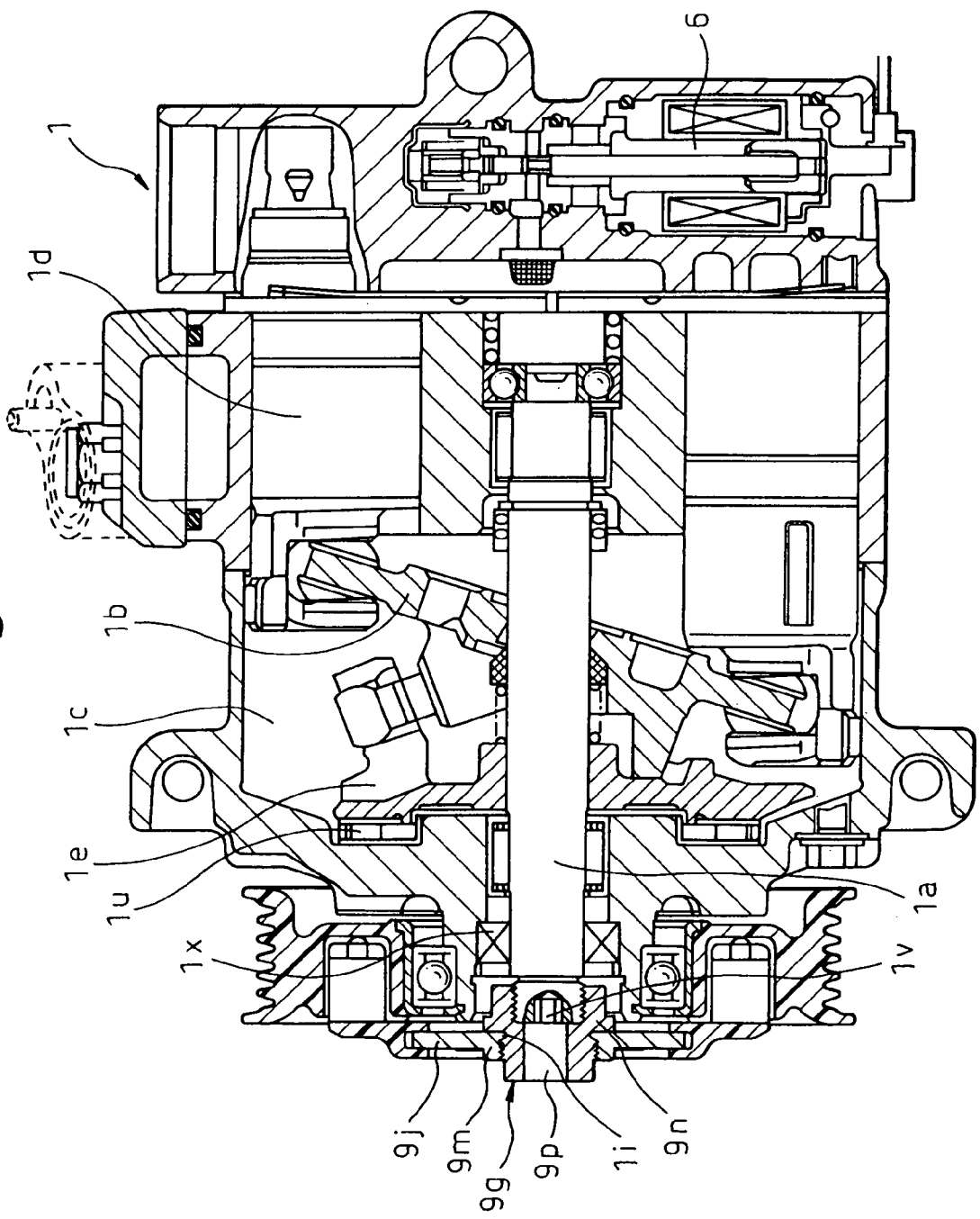
FIG. 9 is a cross-sectional view of a swash plate type variable displacement compressor according to Embodiment 6 of the present invention.

Embodiment 6 will be explained below. In Embodiment 1, the pulley 9 which constitutes the input side rotating member and the shaft 1a which constitutes the output side rotating member are directly connected through a screw engagement. However, according to the sixth embodiment, as shown in FIG. 9, the boss 9g and the pulley 9 (center hub 9f) made of a separate piece from the boss, are made integral by a screw engagement. As in Embodiment 1, the boss 9g which constitutes an intermediate rotating member and the shaft 1a are connected through a screw engagement and the boss 9g is provided with the breakable part 1i.

Concretely, the bridge 9j is provided, on the boss 9g side, with a cylinder 9m having a two-parallel-plane shape such as a hexagon, by welding or integral molding. The cylinder 9m is provided with the female screw to be engaged with the male screw formed on the boss 9g. The male screw and the female screw are provided in a direction to increase the tightening torque when the pulley 9 is powered by the engine 8.

The male screw of the boss 9g is provided on its root part with a large diameter part 9n having an outer diameter larger than that of the male screw. In accordance with the axial tension produced when the pulley 9 is screwed onto the boss 9g, the power supplied from the engine 8 is transmitted from the pulley 9 to the boss 9g due to the frictional force produced on the contact surfaces between the large diameter part 9n and the cylinder 9m.

The power transmission from the boss 9g to the shaft 1a is performed by the frictional force produced on the contact surfaces between a front end of the shaft 1a and the boss 9g, in accordance with the axial tension produced when the boss 9g is screwed onto the shaft 1a.

As in Embodiment 1, the breakable part 1i according to this embodiment is constituted by a reduced diameter portion formed on a root part of the male screw of the boss 9g and having an equivalent diameter smaller than the screw diameter of the male screw part.

The mode of operation and effect of this embodiment will be explained below.

While the compressor 1 normally operates, the driving torque for driving the compressor 1 is smaller than the engaging torque and the torque output from the engine 8 is transmitted through the pulley 9 and the boss 9g to the shaft 1a, i.e., the compressor 1.

When the sliding part of the compressor is stuck due to burning, etc. for some reasons, the tightening torque is increased in accordance with an increase in the torque transmitted to the pulley 9, to thereby increase the tensile axial force acting on the boss 9g. Consequently, when the tensile axial force acting on the breakable part 1i is above the axial tension equivalent to the breaking torque, the breakable part 1i is broken to interrupt the transmission of the torque.

The stress at which the breakable part 1i is fractured is not a shearing stress but mainly a tensile stress (a normal stress) caused by a tensile axial force. Unlike the shearing stress, the tensile stress is generally uniformly distributed in a cross section, so that the stress distribution of the breakable part 1i can be relatively precisely calculated and analyzed.

Consequently, the necessity to determine the dimension and the material, etc. of the breakable part 1i by trial and error is reduced to facilitate the design and development. The breakable part 1i can be certainly broken at a predetermined torque, without being fractured by fatigue, so that no mis-operation of a torque limiter function occurs.

In Embodiment 1, because the two-parallel-plane portion, etc. formed at the front end of the shaft 1a (the small diameter part 1g is provided with a tool engagement part for assembling and disassembling the pulley 9 and the shaft 1a, the dimension of the tool engagement part must be smaller than the diameter of the breakable part 1i and it is difficult to make the dimension of the tool engagement part larger. As a result, in Embodiment 1, it is difficult to provide a sufficient strength to the tool engagement part and the assembling and disassembling can not be efficiently performed.

Figure 10:
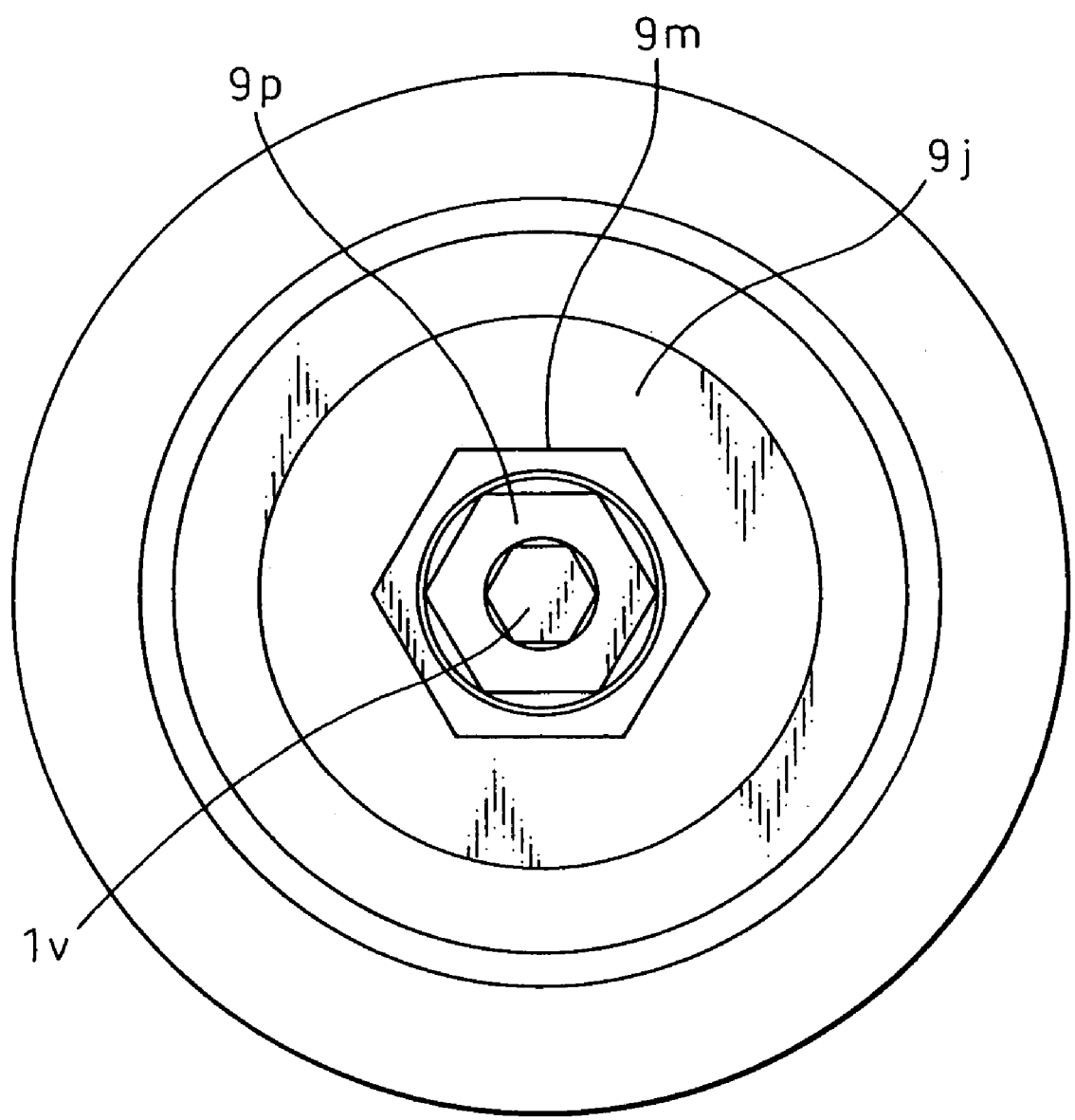
FIG. 10 is a left side view of FIG. 9.

On the contrary, according to the sixth embodiment, the assembling and disassembling of the pulley 9 and the boss 9g and the assembling and disassembling of the boss 9g and the shaft 1a are performed, as shown in FIGS. 9 and 10, by mounting a tool to the tool engagement part such as the two-parallel-plane portion formed on an outer periphery of the cylinder 9m, a hexagonal hole 9p provided at the center of the boss 9g and a hexagonal hole 1v, etc. provided at a front end of the shaft 1a, etc. According to this embodiment, as the pulley 9 is connected to the shaft 1a through the boss 9g which constitutes an intermediate rotating member, the tool engagement part can be easily made larger to an appropriate size by providing the boss 9g of an appropriate size.

Consequently, the strength of the tool engagement part can be easily ensured and the workability in the assembling and disassembling can be enhanced.

According to this embodiment, the portion of the shaft 1a exposed to the air, i.e., a substantial part of the shaft closer to the front end than a shaft seal 1x is covered with the boss 9g, so that it is less necessary for the shaft 1a to be subject to rust-proofing treatment, such as a plating and the manufacturing cost of the shaft 1a, i.e., the compressor 1 can be reduced.

If the shaft 1a is plated, it is necessary to grind the contact surface of the shaft 1a with the shaft seal 1x and the sliding surface of the shaft 1a to the bearing, after the plating process, thus resulting in an increase in the number of the manufacturing processes of the compressor.

If the rust-proofing treatment is performed for the boss 9g, etc., the front end of the shaft 1a can provide a sufficient rust-proof effect.

Lastly, other embodiments will be explained below. In Embodiment 1, the breakable part 1i is constituted by a reduced diameter portion 1i formed on a root part of the small diameter part 1g, i.e., a part of the small diameter part 1g close to the large diameter part 1h and having an equivalent diameter smaller than the screw diameter of the male screw part. However, the present invention is not limited thereto and the breakable part 1i may be constituted by providing, for example, a cut-away portion.

Although the above-mentioned embodiments have been applied to a swash plate type compressor, the present invention is not limited thereto and is applicable to other types of compressors, etc.

While the invention has been described by reference to specific embodiments chosen for purposes of illustration, it should be apparent that numerous modifications could be made thereto by those skilled in the art without departing from the basic concept and scope of the invention.

The invention claimed is:

1. A rotating apparatus with a torque limiter function, comprising:
   an input side rotating member which is rotated in accordance with a drive force produced by a drive source; and
   an output side rotating member which is connected to the input side rotating member through a screw engagement and is rotated integrally with the input side rotating member;
   wherein:
   the screw engagement portion, between the input side rotating member and the output side rotating member, is provided with threads so as to increase a tightening torque when the input side rotating member is powered by the drive source;
   the output side rotating member is provided with a breakable part which is fractured due to a tensile axial force produced by the tightening torque when the tightening torque acting on the screw engagement portion is above a predetermined value;
   the output side rotating member includes a shaft having a stepped portion defined by a small diameter part and a large diameter part;
   the male screw part and the breakable part are provided on the small diameter part; and
   the input side rotating member is pressed against the stepped portion by the axial tension produced by the tightening torque.

2. A rotating apparatus with a torque limiter function as set forth in claim 1, wherein:
   the screw engagement portion is comprised of a male screw part provided on the output side rotating member and a female screw part provided on the input side rotating member, and
   the breakable part is constituted by a reduced diameter portion formed on a part of the output side rotating member and having an equivalent diameter smaller than the screw diameter of the male screw part.

3. A rotating apparatus with a torque limiter function as set forth in claim 1, in a swash-plate compressor, the rotating apparatus further comprising:
   a lug plate including:
      a hub secured to the shaft;
      an outer periphery located on an outer peripheral side, the outer periphery connected to a swash plate of the swash-plate compressor; and
      a bridge having a reduced mechanical strength, the bridge connecting the hub and the outer periphery.

4. A rotating apparatus with a torque limiter function as set forth in claim 1, in a swash-plate compressor,
   wherein:
   the output side rotating member is a separate piece from a shaft of the swash-plate compressor;
   the output side rotating member further includes a flange;
   the output side rotating member is threaded to the shaft of the swash-plate compressor by a screw engagement portion formed on a cylindrical part extending from an end surface of the flange to a shaft side of the swash-plate compressor;
   the output side rotating member further includes a lug plate secured to the shaft and contacts axially with the flange; and
   the output side rotating member further includes a second breakable part formed between the screw engagement portion and the end surface of the flange, the second breakable part capable of being fractured when a tensile axial force produced when the screw engagement portion is tightened further and a contact surface pressure between the lug plate and the flange increases above a predetermined value.

* * * * *